(12) United States Patent
Oba et al.

(10) Patent No.: US 9,459,490 B2
(45) Date of Patent: Oct. 4, 2016

(54) POLARIZING PLATE, IMAGE DISPLAY APPARATUS, AND LIQUID CRYSTAL DISPLAY APPARATUS

(71) Applicant: FUJIFILM Corporation, Tokyo (JP)

(72) Inventors: Tatsuya Oba, Kanagawa (JP); Yoshitaka Maeda, Kanagawa (JP); Xiao Ling, Kanagawa (JP); Shun Inoue, Kanagawa (JP); Takahiro Ohno, Kanagawa (JP); Yohei Takahashi, Kanagawa (JP); Megumi Sekiguchi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/687,095

(22) Filed: Apr. 15, 2015

(65) Prior Publication Data

US 2015/0301403 A1  Oct. 22, 2015

(30) Foreign Application Priority Data

Apr. 16, 2014 (JP) ................................ 2014-084807

(51) Int. Cl.
| | | |
|---|---|---|
| G02F 1/1335 | (2006.01) | |
| G02B 1/14 | (2015.01) | |
| G02B 5/30 | (2006.01) | |

(52) U.S. Cl.
CPC ........... G02F 1/133528 (2013.01); G02B 1/14 (2015.01); G02B 5/3033 (2013.01)

(58) Field of Classification Search
CPC .. G02F 1/133528; G02B 5/3033; G02B 1/14
See application file for complete search history.

(56) References Cited

U.S. PATENT DOCUMENTS

| | | | | |
|---|---|---|---|---|
| 6,342,934 B1* | 1/2002 | Kameyama | .......... | G02B 5/3016 349/117 |
| 7,911,564 B2 | 3/2011 | Nakano et al. | | |
| 2007/0117918 A1* | 5/2007 | Kim | ...................... | C09J 133/06 524/556 |
| 2007/0222920 A1* | 9/2007 | Oka | ...................... | G02B 5/305 349/96 |
| 2008/0254236 A1* | 10/2008 | Kawanishi | ................. | C08J 5/18 428/1.1 |
| 2009/0051856 A1* | 2/2009 | Sugiyama | .................. | C08J 5/18 349/96 |
| 2009/0110849 A1* | 4/2009 | Nishina | ................. | C08F 220/18 428/1.31 |
| 2009/0252897 A1* | 10/2009 | Matsuo | ................... | B32B 27/32 428/1.31 |
| 2010/0208343 A1* | 8/2010 | Yoshida | ................ | C08F 220/18 359/485.01 |
| 2010/0238383 A1 | 9/2010 | Nakano et al. | | |
| 2012/0308798 A1 | 12/2012 | Ryu et al. | | |
| 2014/0116618 A1* | 5/2014 | Nakata | .............. | B29C 66/83415 156/308.2 |
| 2014/0347730 A1* | 11/2014 | Takeda | ................... | G02B 5/305 359/513 |

FOREIGN PATENT DOCUMENTS

| | | | |
|---|---|---|---|
| JP | 2006-301572 | A | 11/2006 |
| JP | 2007-094396 | A | 4/2007 |
| JP | 2007-233215 | A | 9/2007 |
| JP | 2008-020891 | A | 1/2008 |
| JP | 2008-107432 | A | 5/2008 |
| JP | 2010-197978 | A | 9/2010 |
| JP | 2013-513832 | A | 4/2013 |

OTHER PUBLICATIONS

Office Action, issued by the Japanese Patent Office on Aug. 9, 2016, in connection with corresponding Japanese Patent Application No. 2015-083060.

\* cited by examiner

*Primary Examiner* — Donald Raleigh
(74) *Attorney, Agent, or Firm* — Jean C. Edwards, Esq.; Edwards Neils LLC

(57) ABSTRACT

A polarizing plate includes: a polymer film; a polarizer; and a stress relaxation layer disposed between the polymer film and the polarizer, wherein a relationship of the following Expression (1) is satisfied, a thickness of the polymer film is equal to or greater than 10 μm, a distance(Ds) from the surface of the polarizing plate on the side of the polymer film to the interface between the polymer film and the stress relaxation layer is equal to or greater than 15 μm, a difference between the distance(Ds) and a thickness(C) of the polymer film is less than 15 μm, and a total thickness of the polymer film and the stress relaxation layer is equal to or less than 80 μm, $0.01 < B/A < 0.9$ ... (1), in Expression (1), A represents the elastic modulus of the polymer film, and B represents the elastic modulus of the stress relaxation layer.

14 Claims, 1 Drawing Sheet

POLARIZING PLATE, IMAGE DISPLAY APPARATUS, AND LIQUID CRYSTAL DISPLAY APPARATUS

CROSS-REFERENCE TO RELATED APPLICATIONS

The present application claims priority under 35 U.S.C. §119 to Japanese Patent Application No. 2014-084807, filed on Apr. 16, 2014. The above application is hereby expressly incorporated by reference, in its entirety, into the present application.

BACKGROUND OF THE INVENTION

The present invention relates to a polarizing plate, an image display apparatus, and a liquid crystal display apparatus.

In recent years, image display apparatuses, particularly, medium- and small-sized liquid crystal display apparatuses have been made thinner. As a result, members (for example, a polarizing plate) used in such apparatuses are also required to be made thinner. Examples of the method for making a polarizing plate thinner include a method of making a polarizer thinner or making a protective film of the polarizer thinner, a method of removing a protective film or phase difference film disposed between a polarizer and a liquid crystal cell, and the like.

For example, JP 2008-107432 A describes "a polarizing plate, wherein an interposing layer formed of thermosetting resin is directly laminated on at least one surface of a polarizer, and a hard coat layer formed of thermosetting resin or photocurable resin is directly laminated on the interposing layer" (claim 1). The document describes an embodiment in which both the interposing layer and the hard coat layer have a thickness of 5 μm to 25 μm (claim 10).

JP 2013-513832 A describes "a polarizing plate comprising a) a polarizer, and b) a cured resin layer that is disposed on at least one surface of the polarizer and formed of a photocurable composition containing, with respect to 100 parts by weight of the photocurable composition, (A) a photocurable acryl-based polymer in an amount of 4 parts by weight to 95 parts by weight, (B) a polyfunctional acryl-based monomer in an amount of 4 parts by weight to 9.5 parts by weight and (C) a photopolymerization initiator in an amount of 1 part by weight to 20 parts by weight" (claim 1). The document also describes an embodiment in which an adhesive layer is disposed between the polarizer and the cured resin layer, and an embodiment in which the cured resin layer is formed directly on the polarizer (claim 15 and claim 16).

SUMMARY OF THE INVENTION

The present inventors revealed that even when the hard coat layer is disposed on the surface of the polarizer as described in JP 2008-107432 A and JP 2013-513832 A, due to thinning of the polarizing plate, the pencil hardness of the surface of the polarizing plate becomes insufficient in some cases.

Therefore, an object of the present invention is to provide a polarizing plate, of which the surface exhibits excellent pencil hardness even when the polarizing plate is made thinner, and an image display apparatus as well as a liquid crystal display apparatus that use the polarizing plate.

In order to achieve the aforementioned object, the present inventors conducted intensive examination. As a result, they found that if a stress relaxation layer having an elastic modulus satisfying a predetermined relationship with a polymer film is disposed between a polarizer and the polymer film, the pencil hardness of the surface of the polarizing plate can become excellent even when the total thickness of the polarizing plate is reduced. Based on the finding, the present inventors accomplished the present invention.

That is, the present inventors found that the aforementioned object can be achieved by the following constitution.

[1] A polarizing plate comprising a polymer film, a polarizer, and a stress relaxation layer disposed between the polymer film and the polarizer, in which an elastic modulus of each of the polymer film and the stress relaxation layer satisfies a relationship of the following Expression (1), a thickness of the polymer film is equal to or greater than 10 μm, a (distance Ds from the surface of the polarizing plate on the side of the polymer film to the interface between the polymer film and the stress relaxation layer is equal to or greater than 15 μm, a difference between the distance Ds and a thickness C of the polymer film is less than 15 μm, and a total thickness of the polymer film and the stress relaxation layer is equal to or less than 80 μm.

$$0.01 < B/A < 0.9 \tag{1}$$

(In Expression (1), A represents the elastic modulus of the polymer film, and B represents the elastic modulus of the stress relaxation layer.)

[2] The polarizing plate described in [1], in which the thickness of each of the polymer film and the stress relaxation layer satisfies a relationship of the following Expression (2).

$$0.02 < D/C < 0.25 \tag{2}$$

(In Expression (2), C represents the thickness of the polymer film, and D represents the thickness of the stress relaxation layer.)

[3] The polarizing plate described in [1] or [2], in which the thickness of the polymer film is 20 μm to 60 μm.

[4] The polarizing plate described in any one of [1] to [3], in which the thickness of the stress relaxation layer is 1 μm to 15 μm.

[5] The polarizing plate described in any one of [1] to [4], further comprising a hard coat layer disposed on a side of the polymer film that is opposite to the side where the stress relaxation layer is disposed.

[6] The polarizing plate described in any one of [1] to [5], in which the thickness of the polarizer is equal to or less than 25 μm.

[7] An image display apparatus comprising the polarizing plate described in any one of [1] to [6], and a display element.

[8] A liquid crystal display apparatus comprising a liquid crystal cell, and a pair of polarizing plates disposed in a state of interposing the liquid crystal cell therebetween, in which at least one of the pair of polarizing plates is the polarizing plate described in any one of [1] to [6].

According to the present invention, it is possible to provide a polarizing plate, of which the surface exhibits excellent pencil hardness even when the polarizing plate is made thinner, and to provide an image display apparatus as well as a liquid crystal display apparatus that use the polarizing plate.

DETAILED DESCRIPTION OF THE INVENTION

Figure 1:
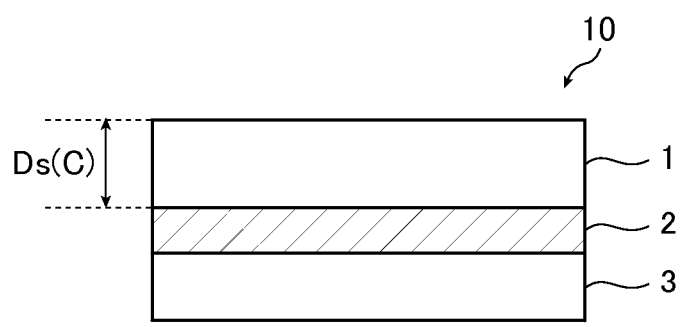
FIG. 1 is a schematic cross-sectional view showing an example of an embodiment of a polarizing plate of the present invention.

Hereinafter, the present invention will be described in detail.

The following constituents will be described based on typical embodiments of the present invention in some cases, but the present invention is not limited to those embodiments.

In the present specification, a range of numerical values that is indicated using "to" means a range in which numerical values before and after "to" are included therein as a lower limit and an upper limit.

[Polarizing Plate]

The polarizing plate of the present invention is a polarizing plate having a polymer film, a polarizer, and a stress relaxation layer disposed between the polymer film and the polarizer. An elastic modulus of each of the polymer film and the stress relaxation layer satisfies a relationship of the following Expression (1). A thickness of the polymer film is equal to or greater than 10 µm. A distance Ds from the surface of the polarizing plate on the side of the polymer film to the interface between the polymer film and the stress relaxation layer is equal to or greater than 15 µm. A difference between the distance Ds and a thickness C of the polymer film is less than 15 µm. The total thickness of the polymer film and the stress relaxation layer is equal to or less than 80 µm.

$$0.01 < B/A < 0.9 \qquad (1)$$

(In the expression, A represents the elastic modulus of the polymer film, and B represents the elastic modulus of the stress relaxation layer.)

In the present invention, the stress relaxation layer is disposed between the polarizer and the polymer film, and the elastic modulus of each of the polymer film and the stress relaxation layer satisfies Expression (1). Accordingly, even when the thickness of the polarizing plate is reduced, the surface of the polarizing plate exhibits excellent pencil hardness.

In the present invention, the thickness of the polarizing plate is preferably equal to or less than 90 µm, more preferably equal to or less than 70 µm, and even more preferably equal to or less than 65 µm.

The reason why the surface of the polarizing plate exhibits excellent pencil hardness has not been revealed in detail. However, the following is assumed to be the reason.

First, it is considered that when a stress is applied to a film having a thickness of equal to or greater than 15 µm, the point of stress concentration may be positioned not on the film surface to which the stress is applied but inside the film.

In the polarizing plate of the present invention, the thickness of the polymer film is equal to or greater than 10 µm, the distance Ds from the surface of the polarizing plate on the side of the polymer film to the interface between the polymer film and the stress relaxation layer is equal to or greater than 15 µm, and the difference between the distance Ds and the thickness C of the polymer film is less than 15 µm. Therefore, it is considered that when a stress is applied to the surface of the polarizing plate on a visually recognized side (side opposite to a display element), the point of stress concentration may be positioned in the polymer film.

It is also considered that the surface hardness of a film may be influenced by the hardness of a layer adjacent to the surface opposite to the stress-applied surface (a layer adjacent to a layer constituting the stress-applied surface).

Accordingly, it is considered that when a stress is applied to the surface of the polarizing plate on the visually recognized side, because the layer (the stress relaxation layer in the present invention) adjacent to the layer (the polymer film in the present invention) in which the point of stress concentration is positioned is softer than the layer in which the point of stress concentration is positioned, physical strain may spread in the thickness direction thereof, and thus, local strain resulting from stress concentration can be reduced.

Figure 2:
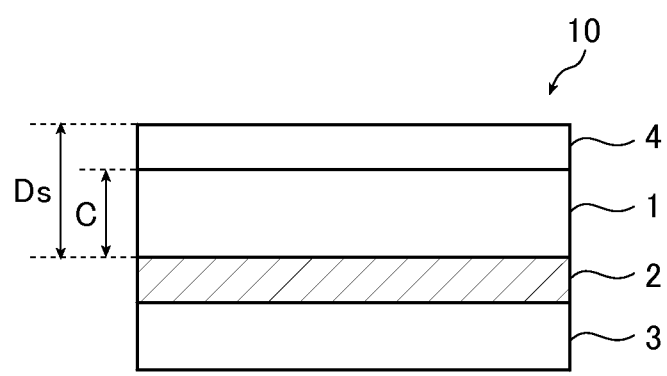
FIG. 2 is a schematic cross-sectional view showing another example of the embodiment of the polarizing plate of the present invention.

Each of FIGS. 1 and 2 is a schematic cross-sectional view showing an example of an embodiment of the polarizing plate of the present invention.

A polarizing plate 10 shown in FIG. 1 has a polymer film 1, a stress relaxation layer 2, and a polarizer 3 in this order.

The polarizing plate 10 shown in FIG. 2 has a hard coat layer 4, the polymer film 1, the stress relaxation layer 2, and the polarizer 3 in this order.

Herein, the polarizing plate 10 shown in FIG. 1 does not have a hard coat layer. Therefore, a difference between the distance Ds from the surface of the polarizing plate 10 on the side of the polymer film 1 to the interface between the polymer film 1 and the stress relaxation layer 2 and the thickness C of the polymer film 1 becomes 0 µm, and the distance Ds becomes the same as the thickness of the polymer film 1.

In contrast, the polarizing plate 10 shown in FIG. 2 includes the hard coat layer 4. Therefore, a difference between the distance Ds from the surface of the polarizing plate 10 on the side of the polymer film 1, that is, the surface of the hard coat layer 4 to the interface between the polymer film 1 and the stress relaxation layer 2 and the thickness C of the polymer film 1 becomes less than 15 µm.

In the polarizing plate 10 shown in FIGS. 1 and 2, the elastic modulus of each of the polymer film 1 and the stress relaxation layer 2 satisfies Expression (1); the thickness of the polymer film 1 is equal to or greater than 10 µm; the distance Ds is equal to or greater than 15 µm; and the total thickness of the polymer film 1 and the stress relaxation layer 2 is equal to or less than 80 µm.

Hereinafter, each of the layers constituting the polarizing plate of the present invention will be specifically described.

[Polymer Film]

The polymer film included in the polarizing plate of the present invention is not particularly limited, and a generally used polymer film can be used.

Specific examples of the polymer film include a cellulose acylate-based film, a (meth)acryl-based resin film, a cycloolefin-based resin film, a polyester-based resin film, a polycarbonate-based resin film, a polyolefin-based resin film, and the like.

Herein, the (meth)acryl-based resin conceptually include both the methacryl-based resin and acryl-based resin. The (meth)acryl-based resin also includes derivatives of acrylate/methacrylate, and particularly, (co)polymers of acrylate esters/methacrylate esters. Moreover, the (meth)acryl-based resin also includes (meth)acryl-based polymers having a ring structure on a main chain thereof, in addition to methacryl-based resin and acryl-based resin, and the (meth)acryl-based polymers include polymers having a lactone ring, maleic anhydride-based polymers having a succinic anhydride ring, polymers having a glutaric anhydride ring, and glutarimide ring-containing polymers.

Among these, from the viewpoint of workability or optical performance, a cellulose acylate-based film and a (meth) acryl resin-based film are preferable.

As the cellulose acylate-based film that can be suitably used as the polymer film, various known cellulose acylate-based films can be used. Specifically, for example, those described in JP 2012-076051 A, and the like can be used.

As the (meth)acryl resin-based film, various known (meth)acryl resin-based films can be used. Specifically, for example, it is possible to appropriately adopt the acryl films described in paragraphs [0032] to [0063] in JP 2010-079175 A, the lactone ring-containing polymers described in paragraphs [0017] to [0107] in JP 2009-98605 A, and the like.

<Thickness>

The thickness of the polymer film is equal to or greater than 10 μm. The thickness of the polymer film is not particularly limited as long as the distance Ds from the surface of the polarizing plate on the side of the polymer film to the interface between the polymer film and the stress relaxation layer is equal to or greater than 15 μm, and the total thickness of the polymer film and the stress relaxation layer is equal to or less than 80 μm. However, from the view point of making the polarizing film thinner, the thickness of the polymer film is preferably 20 μm to 60 μm, and more preferably 20 μm to 50 μm.

<Elastic Modulus>

The elastic modulus of the polymer film is not particularly limited, as long as the relationship between the elastic modulus of the polymer film and the elastic modulus of the stress relaxation layer, which will be described later, satisfies Expression (1). However, the elastic modulus of the polymer film is preferably 1 GPa to 6 GPa, more preferably 2 GPa to 6 GPa, and even more preferably 3 GPa to 6 GPa, since within the above range, the pencil hardness of the surface of the polarizing plate and the brittleness of the polarizing plate can be further improved.

Herein, for determining the elastic modulus of the polymer film, a total of 8 samples each having 100 mm long in a measurement direction and 10 mm wide are prepared by being cut at an azimuth varied by 45° in the measurement direction. For each sample, an elastic modulus is calculated, and among the elastic moduli, the minimum value is taken as the elastic modulus of the polymer film. In order to calculate the elastic modulus for each sample, each sample is left for 24 hours in an environment at 25° C. and a relative humidity of 60%. Immediately thereafter, in an atmosphere at 25° C. and a relative humidity of 60%, by using a universal tensile tester "STM T50BP" manufactured by Toyo Baldwin Co., Ltd., the sample is stretched in an inter-chuck length of 100 mm at a tensile rate of 10%/min. At this time, the stress applied when the sample is stretched 0.1% and 0.5% is measured, and from the slope thereof, the elastic modulus is calculated.

When the sample size does not satisfy 100 mm×10 mm, the elastic modulus can be determined as follows. A total of 8 samples, which have undergone humidity conditioning for 3 days at 25° C. and a relative humidity of 60%, are prepared by being cut at an azimuth varied by 45° in a measurement direction such that each sample becomes 35 mm long in the measurement direction and 5 mm wide. For each sample, an elastic modulus is calculated, and among the elastic moduli, the minimum value is taken as the elastic modulus of the polymer film. In this case, the elastic modulus of each sample is calculated as follows. The environment of a measurement chamber is set to a relative humidity of 60%, and by using a dynamic viscoelasticity measuring apparatus (DVA-225 manufactured by IT Keisoku Seigyo K.K.) in a tensile mode, the elastic modulus is measured at 0° C. to 100° C., at a frequency of 1 Hz and a displacement amplitude of 0.02 mm, and in a state of increasing temperature at a rate of 2° C./min. The average of elastic moduli at a temperature of 20° C. to 30° C. is calculated and taken as the elastic modulus of the polymer film.

[Stress Relaxation Layer]

The stress relaxation layer included in the polarizing plate of the present invention is not particularly limited, as long as the elastic modulus of the stress relaxation layer satisfies the relationship represented by Expression (1). Examples of the stress relaxation layer include a layer formed of a composition containing a compound having an unsaturated double bond (hereinafter, the composition is also simply referred to as a "curable composition for a stress relaxation layer"), a layer containing cyclic polyolefin-based resin, and the like.

As described above, examples of the polymer film includes a (meth)acryl-based resin film and a cycloolefin-based resin film. However, in the present invention, it is not necessary for all of the materials exemplified as the polymer film and all of the materials exemplified as the stress relaxation layer to satisfy the relationship in Expression (1). Only the elastic modulus of each of the polymer film and the stress relaxation layer constituting a single polarizing plate needs to satisfy the relationship in Expression (1).

<Layer Formed of Curable Composition for Stress Relaxation Layer>

The layer formed of the curable composition for a stress relaxation layer can be formed by directly coating a substrate layer, which will be described later, with a composition, which contains a compound having an unsaturated double bond group in a molecule as a main component and further contains a polymerization initiator, a solvent, a fluorine-containing compound or a silicone-based compound, inorganic fine particles, and an inorganic laminar compound if necessary, or coating the substrate layer with the composition through another layer (for example, an easily adhesive layer), and drying and curing the resultant. Each of the components will be described below. Herein, the main component of the composition or the layer refers to a component accounting for 50% by mass or more of the composition or the layer.

In the present invention, the compound having an unsaturated double bond group in a molecule preferably further has a cyclic aliphatic hydrocarbon group, because such a compound can give low moisture permeability to the polarizing plate, prevent the warpage of a panel resulting from the influence of humidity or the like, and inhibit the display unevenness resulting from the warpage.

(Compound having Cyclic Aliphatic Hydrocarbon Group and Unsaturated Double Bond Group in Molecule)

The compound having a cyclic aliphatic hydrocarbon group and an unsaturated double bond group in a molecule can function as a binder.

The compound can also function as a hardening agent, and can give low moisture permeability to the coating film and can also improve the strength or scratch resistance of the coating film.

The cyclic aliphatic hydrocarbon group is preferably a group derived from an alicyclic compound having 7 or more carbon atoms, more preferably a group derived from an alicyclic compound having 10 or more carbon atoms, and even more preferably a group derived from an alicyclic compound having 12 or more carbon atoms.

The cyclic aliphatic hydrocarbon group is particularly preferably a group derived from a polycyclic compound such as a bicyclic compound or a tricyclic compound.

More preferably, examples thereof include the central skeleton of the compound described in Claims in JP 2006-215096 A, the central skeleton of the compound described in JP 2001-10999 A, skeletons of adamantane derivatives, and the like.

The cyclic aliphatic hydrocarbon group (including a linking group) is preferably a group represented by any of the following Formulae (I) to (V), more preferably a group represented by the following Formula (I), (II), or (IV), and even more preferably a group represented by the following Formula (I).

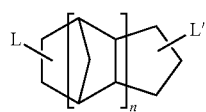
(I)

In Formula (I), each of L and L' independently represents a linking group having a valency of equal to or greater than 2. n represents an integer of 1 to 3.

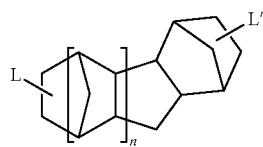
(II)

In Formula (II), each of L and L' independently represents a linking group having a valency of equal to or greater than 2. n represents an integer of 1 to 2.

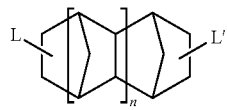
(III)

In Formula (III), each of L and L' independently represents a linking group having a valency of equal to or greater than 2. n represents an integer of 1 to 2.

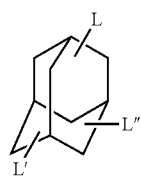
(IV)

In Formula (IV), each of L and L' independently represents a linking group having a valency of equal to or greater than 2, and L" represents a hydrogen atom or a linking group having a valency of equal to or greater than 2.

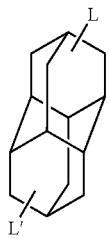
(V)

In Formula (V), each of L and L' independently represents a linking group having a valency of equal to or greater than 2.

Specific examples of the cyclic aliphatic hydrocarbon group include norbornyl, tricyclodecanyl, tetracyclododecanyl, pentacyclopentadecanyl, adamantyl, diamantanyl, and the like.

Examples of the unsaturated double bond group include polymerizable functional groups such as a (meth)acryloyl group, a vinyl group, a styryl group, and an allyl group, and among these, a (meth)acryloyl group and —C(O)OCH=CH$_2$ are preferable. Particularly, the following compounds containing 3 or more (meth)acryloyl groups in a single molecule can be preferably used. The "(meth)acryloyl group" conceptually includes a methacryloyl group or an acryloyl group, and the same concept is applied to (meth) acrylic acid, (meth)acryloyl chloride, (meth)acrylic anhydride, glycidyl (meth)acrylate, and (meth)acryl resin, which will be described below.

The number of the unsaturated double bond group is not particularly limited as long as the elastic modulus of the stress relaxation layer satisfies the relationship represented by Expression (1). However, the number of the unsaturated double bond group is preferably equal to or greater than 2, and more preferably 2 to 4, since within the above range, it is possible to inhibit the deformation of the stress relaxation layer while maintaining excellent pencil hardness of the surface of the polarizing plate.

The compound which has the cyclic aliphatic hydrocarbon group and has 3 or more unsaturated double bond groups in a molecule has a constitution in which the cyclic aliphatic hydrocarbon group is bonded to the group having an unsaturated double bond through a linking group.

Examples of the linking group include a single bond, an alkylene group having 1 to 6 carbon atoms which may be substituted, an amide group in which the N-position may be substituted, a carbamoyl group in which the N-position may be substituted, an ester group, an oxycarbonyl group, an ether group, and a group composed of a combination of these.

These compounds can be easily synthesized by reacting polyol such as diol or triol having the cyclic aliphatic hydrocarbon group with carboxylic acid, a carboxylic acid derivative, an epoxy derivative, an isocynate derivative, or the like of a compound having a (meth)acryloyl group, a vinyl group, a styryl group, an allyl group, or the like, through a one-stage reaction or a two-stage reaction.

Preferably, the compounds can be synthesized by reacting a compound such as (meth)acrylic acid, (meth)acryloyl chloride, (meth)acrylic anhydride, or glycidyl (meth)acrylate or the compound (for example, 1,1-bis(acryloxymethyl) ethyl isocyanate) described in WO 2012/00316 A with polyol having the cyclic aliphatic hydrocarbon group.

Examples of a preferable compound having the cyclic aliphatic hydrocarbon group and the unsaturated double bond group will be specifically described below, but the present invention is not limited thereto.

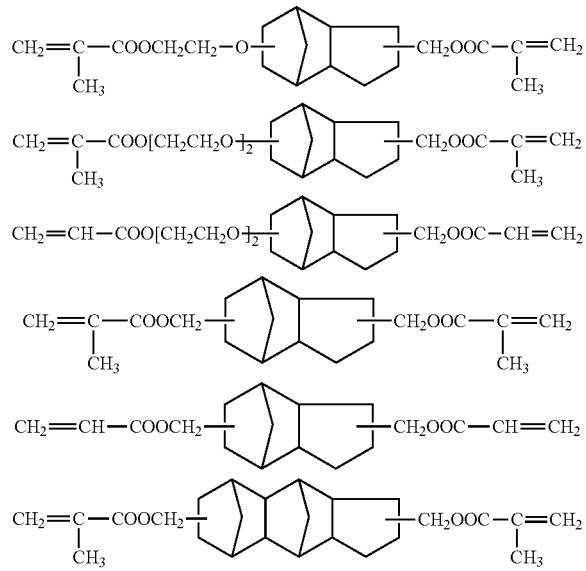

(Compound which has Unsaturated Double Bond Group but does not have Cyclic Aliphatic Hydrocarbon Group in Molecule)

As a compound which has the unsaturated double bond group but does not have the cyclic aliphatic hydrocarbon group, for example, a (meth)acrylate compound is preferable. Specific examples thereof include (meth)acrylic acid diesters of alkylene glycol, (meth)acrylic acid diesters of polyoxyalkylene glycol, (meth)acrylic acid diesters of polyhydric alcohols, (meth)acrylic acid diesters of ethylene oxide adducts or propylene oxide adducts, epoxy (meth) acrylates, urethane (meth)acrylates, polyester (meth)acrylates, and the like. Examples of the unsaturated double bond group and the preferable number thereof are as described above for the aforementioned compound having the cyclic aliphatic hydrocarbon group.

Among the above compounds, esters of polyhydric alcohols and (meth)acrylic acid are preferable.

Specific examples thereof include 1,4-butanediol di(meth)acrylate, 1,6-hexanediol di(meth)acrylate, neopentyl glycol (meth)acrylate, ethylene glycol di(meth)acrylate, triethylene glycol di(meth)acrylate, pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, SO-modified phosphoric acid tri (meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, polyurethane polyacrylate, polyester polyacrylate, caprolactone-modified tris (acryloxyethyl)isocyanurate, and the like.

As polyfunctional acrylate-based compounds having a (meth)acryloyl group, commercially available products can also be used. Specific examples thereof include NK Ester A-TMMT manufactured by SHIN-NAKAMURA CHEMICAL CO., LTD., KAYARAD DPHA manufactured by Nippon Kayaku Co., Ltd., and the like. Polyfunctional monomers are described in paragraphs [0114] to [0122] in JP 2009-98658 A, and the same polyfunctional monomers can be used in the present invention.

The compound which has the unsaturated double bond group but does not have the cyclic aliphatic hydrocarbon group is preferably a compound having a hydrogen-bonding substituent. The hydrogen-bonding substituent refers to a substituent in which an atom having great electronegativity, such as nitrogen, oxygen, sulfur, or halogen, is coupled with a hydrogen atom through a covalent bond. Specific examples thereof include OH—, SH—, —NH—, CHO—, CHN—, and the like, and urethane (meth)acrylates or (meth) acrylates having a hydroxyl group are preferable. It is also possible to use commercially available polyfunctional acrylates having a (meth)acryloyl group, and examples thereof include NK Oligo U4HA and NK Ester A-TMM-3 manufactured by SHIN-NAKAMURA CHEMICAL CO., LTD., KAYARAD PET-30 manufactured by Nippon Kayaku Co., Ltd., and the like.

(Polymerization Initiator)

The curable composition for a stress relaxation layer preferably contains a polymerization initiator, and the polymerization initiator is preferably a photopolymerization initiator.

Examples of the photopolymerization initiator include acetophenones, benzoins, benzophenones, phosphine oxides, ketals, anthraquinones, thioxanthones, azo compounds, peroxides, 2,3-dialkyl dione compounds, disulfide compounds, fluoroamine compounds, aromatic sulfoniums, lophine dimmers, onium salts, borate salts, active esters, active halogens, inorganic complexes, coumarins, and the like.

Specific examples, preferable embodiments, commercially available products, and the like of the photopolymerization initiator are described in paragraphs [0133] to [0151] in JP 2009-098658 A, and these can be suitably used in the present invention.

Various photopolymerization initiators are exemplified in "The Latest UV Curing Technology" (TECHNICAL INFORMATION INSTITUTE CO., LTD., 1991, p. 159) and "Ultraviolet Curing System" (Kato Kiyomi, SOGO GIJUTSU CENTER, 1989, p. 65-148), and these are useful in the present invention.

Preferable examples of a commercially available photocleavage-type ohotoradical polymerization initiator include "Irgacure 651", "Irgacure 184", "Irgacure 819", "Irgacure 907", "Irgacure 1870" (CGI-403/Irgacure 184 -7/3 mixed initiator), "Irgacure 500", "Irgacure 369", "Irgacure 1173", "Irgacure 2959", "Irgacure 4265", "Irgacure 127", "OXE 01", and the like manufactured by BASE Corporation; "Kayacure DETX-S", "Kayacure BP-100", "Kayacure BDMK", "Kayacure CTX", "Kayacure BMS", "Kayacure 2-EAQ", "Kayacure ABQ", "Kayacure CPTX", "Kayacure EPD", "Kayacure ITX", "Kayacure QTX", "Kayacure BTC", "Kayacure MCA", and the like manufactured by Nippon Kayaku Co., Ltd.; "Esacure (KIP 100F, KB1, EB3, BP, X33, KTO46, KT37, KIP150, TZT)", and the like manufactured by Sartomer Co., Ltd.; and a combination of these.

In order to polymerize the polymerizable compound contained in the composition, and in order not to set too many initiation points, the content of the photopolymerization initiator in the curable composition for a stress relaxation layer is preferably 0.5% by mass to 8% by mass and more preferably 1% by mass to 5% by mass, with respect to the total solid content in the curable composition for a stress relaxation layer.

(Solvent)

The curable composition for a stress relaxation layer can contain a solvent. Considering the solubility of a monomer, drying properties at the time of coating, dispersibility of light-transmitting particles, and the like, various solvents can be used as the solvent. Examples of the solvent include organic solvents such as dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methyl cyclohexanone, ethyl formate, propyl formate, pentyl formate, methyl acetate, ethyl acetate, propyl acetate, methyl propionate, ethyl propionate, γ-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetyl acetone, diacetone alcohol, methyl acetoacetate, ethyl acetoacetate, methyl alcohol, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methyl cyclohexane, ethyl cyclohexane, benzene, toluene, xylene, and the like. One kind of these solvents can be used singly, or two or more kinds thereof can be used in combination.

When the aforementioned polymer film is a cellulose acylate film, at least one kind among dimethyl carbonate, methyl acetate, ethyl acetate, methyl ethyl ketone, acetyl acetone, and acetone is preferably used. The solvent is more preferably either dimethyl carbonate or methyl acetate, and particularly preferably methyl acetate.

The solvent is used such that the concentration of the solid content of the curable composition for a stress relaxation layer is preferably within a range of 20% by mass to 80% by mass, more preferably within a range of 30% by mass to 75% by mass, and even more preferably within a range of 40% by mass to 70% by mass.

(Fluorine-Containing Surfactant or Silicone-Based Surfactant)

In the curable composition for a stress relaxation layer, a known fluorine-containing surfactant or silicone-based surfactant can be used as a surfactant.

Preferable embodiments and specific examples of the fluorine-containing surfactant are described in paragraphs [0023] to [0080] in JP 2007-102206 A, and the present invention can also adopt the same embodiments and specific examples.

Preferable examples of the silicone-based surfactant include silicone-based surfactants which have a plurality of dimethyl silyloxy units as a repeating unit and have substituents on either or both of a terminal and a side chain of the chain of the compound. The chain of the compound containing dimethyl silyloxy as a repeating unit may contain a structural unit other than the dimethyl silyloxy. The substituents may be the same as or different from each other, and the silicone-based surfactant preferably has a plurality of substituents. Preferable examples of the substituent include groups including a polyether group, an alkyl group, an aryl group, an aryloxy group, a cinnamoyl group, an oxetanyl group, a fluoroalkyl group, a polyoxyalkylene group, and the like.

The number-average molecular weight of the silicone-based surfactant is not particularly limited. However, it is preferably equal to or less than 100,000, more preferably equal to or less than 50,000, particularly preferably 1,000 to 30,000, and most preferably 1,000 to 20,000.

Preferable examples of the silicone-based surfactant include "X-22-174DX", "X-22-2426", X22-164C", and "X-22-176D" (trade names) manufactured by Shin-Etsu Chemical Co., Ltd.; "FM-7725", "FM-5521", and "FM-6621" (trade names) manufactured by CHISSO CORPORATION; "DMS-U22" and "RMS-033" (trade names) manufactured by Gelest, Inc.; "SH200", "DC11PA", "ST80PA", "L7604", "FZ-2105", "L-7604", "Y-7006", and "SS-2801" (trade names) manufactured by Dow Corning Toray Co., Ltd.; "TSF400" (trade name) manufactured by Momentive Performance Materials Japan LLC.; and the like. However, the present invention is not limited to these.

The amount of the silicone-based surfactant or the fluorine-containing surfactant contained in the total solid content of the curable composition for a stress relaxation layer is preferably 0.01% by mass to 0.5% by mass and more preferably 0.01% by mass to 0.3% by mass.

(Inorganic Fine Particles)

From the viewpoint of giving low moisture permeability to the polarizing plate, the curable composition for a stress relaxation layer may contain inorganic fine particles.

As the inorganic fine particles, fine particles of inorganic oxides or magnesium fluoride are used. Among these, in view of refractive index, dispersion stability, and cost, fine silica particles are particularly preferable.

The average particle size (primary particle size) of the inorganic fine particles is preferably 30 nm to 100 nm, more preferably 35 cm to 90 nm, and even more preferably 40 nm to 85 nm.

If the average particle size of the inorganic fine particles is 30 nm to 100 nm, the effect of reducing moisture permeability is preferably exhibited.

The inorganic fine particles may be either crystalline or amorphous. Moreover, they may be monodisperse particles, or may be agglomerated particles as long as they satisfy a predetermined particle size, but the particles are preferably monodisperse particles. The inorganic fine particles may be in the form of amorphous particles, porous particles, or hollow particles. However, because it is preferable that an amount water molecules adsorbed by the inorganic fine particles is small, the particles are most preferably in the form of spheres not having a cavity in the inside thereof.

As the inorganic fine particles, two or more kinds differing from each other in terms of the average particle size can be concurrently used.

The average particle size of the inorganic fine particles can be measured by using a known method such as an electron micrograph or a BET method.

The inorganic fine particles are preferably subjected to surface treatment using a common method, and more preferably subjected to surface treatment by means of a silane coupling agent (surface modification).

Particularly, in order to improve the dispersibility of the particles in the curable composition for a stress relaxation layer, the surface of the inorganic fine particles is preferably treated with either or both of a hydrolysate of an organosilane compound and a partial condensate thereof, and it is more preferable that either or both of an acid catalyst and a metal chelate compound are used in the treatment. The method for treating the surface of the inorganic fine particles is described in paragraphs [0046] to [0076] in JP 2008-242314 A. The organosilane compound, the siloxane compound, the solvent and catalyst for the surface treatment, the metal chelate compound, and the like described in the document can also be suitably used in the present invention.

The content of the inorganic fine particles is preferably 10% by mass to 80% by mass, more preferably 15% by mass to 75% by mass, and even more preferably 20% by mass to 70% by mass, with respect to the total solid content of the curable composition for a stress relaxation layer.

(Inorganic Laminar Compound)

From the viewpoint of further giving low moisture permeability to the polarizing plate, the curable composition for a stress relaxation layer may contain an inorganic laminar compound.

Because the surface of the inorganic laminar compound is hydrophilic, the compound is preferably subjected to organification processing.

The inorganic laminar compound is an inorganic compound which has a structure composed of unit crystal layers laminated on each other and has a property of swelling or being cleaved when a solvent is coordinated with or absorbed into spaces among the layers. Examples of such an inorganic compound include swellable hydrous silicates, for example, clay minerals belonging to a smectite group (montmorillonite, saponite, hectorite, and the like), clay minerals belonging to a vermiculite group, clay minerals belonging to a kaolinite group, and phyllosilates (mica and the like). Moreover, synthetic inorganic laminar compounds can be preferably used, and examples thereof include synthetic smectite (hectorite, saponite, stevensite, and the like), synthetic mica, and the like. As the synthetic inorganic laminar compound, smectite, montmorillonite, and mica are preferable, and montmorillonite and mica are more preferable. Examples of a commercially available inorganic laminar compound which can be used in the present invention include MEB-3 (synthetic mica aqueous dispersion manufactured by CO-OP CHEMICAL CO., LTD.), ME-100 (synthetic mica manufactured by CO-OP CHEMICAL CO., LTD.), S1ME (synthetic mica manufactured by CO-OP CHEMICAL CO., LTD.), SWN (synthetic smectite manufactured by CO-OP CHEMICAL CO., LTD.), SWF (synthetic smectite manufactured by CO-OP CHEMICAL CO., LTD.), Kunipia F (purified bentonite manufactured by KUNIMINE INDUSTRIES CO., LTD.), Bengel (purified bentonite manufactured by HOJUN Co., Ltd.), Bengel HV (purified bentonite manufactured by HOJUN Co., Ltd.), Bengel FW (purified bentonite manufactured by HOJUN Co., Ltd.), Bengel Bright 11 (purified bentonite manufactured by HOJUN Co., Ltd.), Bengel Bright 23 (purified bentonite manufactured by HOJUN Co., Ltd.), Bengel Bright 25 (purified bentonite manufactured by HOJUN Co., Ltd.), Bengel A (purified bentonite manufactured by HOJUN Co., Ltd.), Bengel 2M (purified bentonite manufactured by HOJUN Co., Ltd.), and the like.

The above inorganic laminar compounds are preferably inorganic laminar compounds having undergone organification processing.

The inorganic laminar compound is preferably an inorganic laminar compound having undergone atomization processing. Generally, the inorganic laminar compound having undergone atomization processing has a plate-like shape or a flat shape. The planar shape thereof is not particularly limited and may be an amorphous shape or the like. The average particle size (average particle size of the planar shape) of the inorganic laminar compound having undergone atomization processing is, for example, preferably 0.1 μm to 10 μm, more preferably 0.1 μm to 8 μm, and particularly preferably 0.1 μm to 6 μm.

<Layer Containing Cyclic Polyolefin-Based Resin>

The layer containing cyclic polyolefin-based resin is a layer containing cyclic polyolefin-based resin as a main component. The "main component" of a composition or a layer refers to a component accounting for 50% by mass or more of the composition or the layer.

(Cyclic Polyolefin-Based Resin)

The cyclic polyolefin-based resin is polymer resin having a cyclic olefin structure.

Examples of the cyclic polyolefin-based resin include (1) a norbornene-based polymer, (2) a polymer of a monocyclic olefin, (3) a polymer of a cyclic conjugated diene, (4) a vinyl alicyclic hydrocarbon polymer, hydrides of (1) to (4), and the like.

The polymer having a cyclic olefin structure that is preferably used in the present invention includes cyclic polyolefin-based resin, which is an addition (co)polymer containing at least one or more kinds of repeating units represented by the following Formula (II), and cyclic polyolefin-based resin, which is an addition (co)polymer further containing at least one or more kinds of repeating unit represented by Formula (I) if necessary. Moreover, a ring-opened (co)polymer containing at least one kind of cyclic repeating units represented by Formula (III) can also be suitably used.

Formula (I)

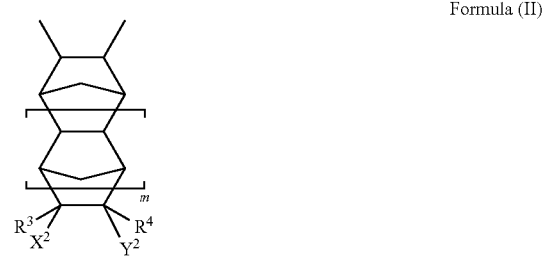

Formula (II)

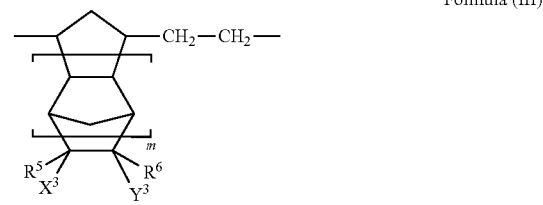

Formula (III)

In Formulae (I) to (III), m represents an integer of 0 to 4. Each of $R^1$ to $R^6$ represents a hydrogen atom or a hydrocarbon group having 1 to 10 carbon atoms. Each of $X^1$ to $X^3$ and $Y^1$ to $Y^3$ represents a hydrogen atom, a hydrocarbon group having 1 to 10 carbon atoms, a halogen atom, a hydrocarbon group having 1 to 10 carbon atoms substituted with a halogen atom, $-(CH_2)_n COOR^{11}$, $-(CH_2)_n OCOR^{12}$, $-(CH_2)_n NCO$, $-(CH_2)_n NO_2$, $-(CH_2)_n CN$, $-(CH_2)_n CONR^{13}R^{14}$, $-(CH_2)_n NR^{13}R^{14}$, $-(CH_2)_n OZ$, or $-(CH_2)_n W$, and herein, $X^1$ and $Y^1$, or $X^2$ and $Y^2$, or $X^3$ and $Y^3$ may constitute $(-CO)_2O$ or $(-CO)_2NR^{15}$. Each of $R^{11}$, $R^{12}$, $R^{13}$, $R^{14}$, and $R^{15}$ represents a hydrogen atom or a hydrocarbon group having 1 to 20 carbon atoms. Z represents a hydrocarbon group or a hydrocarbon group substituted with halogen. W represents $SiR^{16}_p D_{3-p}$ ($R^{16}$ represents a hydrocarbon group having 1 to 10 carbon atoms, D represents a halogen atom, —OCOR$^{16}$, or —OR$^{16}$, and p represents an integer of 0 to 3), and n represents an integer of 0 to 10.

In addition, hydrides of norbornene-based polymers can also be preferably used, and as described in JP 1-240517 A, JP 7-196736 A, JP 60-26024 A, JP 62-19801 A, JP 2003-159767 A, JP 2004-309979 A, and the like, the hydrides can be made by performing addition polymerization or ring-opening metathesis polymerization of unsaturated polycyclic compounds and then hydrogenating the resultants. In the norbornene based polymer used in the present invention, each of $R^3$ to $R^6$ is preferably a hydrogen atom or —CH$_3$. From the viewpoint of low moisture permeability, each of $R^3$ to $R^6$ is more preferably a hydrogen atom. Each of $X^3$ and $Y^3$ is preferably a hydrogen atom, Cl, or —COOCH$_3$. From the view point of low moisture permeability, each of $X^3$ and $Y^3$ is more preferably a hydrogen atom. Other groups are appropriately selected. m is preferably 0 or 1.

Furthermore, a norbornene-based addition (co)polymer can also be preferably used, and it is disclosed in JP 10-7732 A, JP 2002-504184 A, US 2004229157A1, WO 2004/070463A1, and the like. The norbornene-based addition (co)polymer is obtained by addition-polymerizing norbornene-based polycyclic unsaturated compounds. If necessary, the norbornene-based polycyclic unsaturated compound can be addition-polymerized with ethylene, propylene, or butane; a conjugated diene such as butadiene or isoprene; unconjugated diene such as ethylidene norbornene; or a linear diene compound such as acrylonitrile, acrylic acid, methacrylic acid, maleic anhydride, acrylic acid ester, methacrylic acid ester, maleimide, vinyl acetate, or vinyl chloride. Particularly, the norbornene-based addition (co)polymer is preferably a copolymer with ethylene. As a commercially available product of the norbornene-based addition (co)polymer, for example, TOPAS 6013 manufactured by Polyplastics Co., Ltd. can be used.

The layer containing a cyclic polyolefin-based resin is preferably a layer formed by curing a curable composition containing cyclic polyolefin-based resin (hereinafter, the composition will also be simply referred to as a "coating composition for forming a layer containing cyclic polyolefin-based resin).

If necessary, the coating composition for forming a layer containing cyclic polyolefin-based resin may further contain a polymerization initiator, an inorganic laminar compound, a solvent, and the like similarly to the aforementioned curable composition for a stress relaxation layer. Particularly, as the solvent, the following organic solvent is preferably used.

(Organic Solvent)

Examples of the organic solvent usable for the composition for forming a layer containing cyclic polyolefin-based resin include chain-like aliphatic hydrocarbon-based solvents such as n-pentane, n-hexane, n-heptane, liquid paraffin, and mineral spirits; alicyclic hydrocarbon-based solvents such as cyclopentane, cyclohexane, methyl cyclohexane, dimethyl cyclohexane, trimethyl cyclohexane, ethyl cyclohexane, diethyl cyclohexane, decahydronaphthalene, dicycloheptane, tricyclodecane, hexahydroindene, and cyclooctane; aromatic hydrocarbon-based solvents such as benzene, toluene, and xylene; hydrocarbon-based solvents having an alicyclic ring and an aromatic ring, such as indene and tetrahydronaphthalene; nitrogen-containing hydrocarbon-based solvents such as nitromethane, nitrobenzene, and acetonitrile; oxygen-containing hydrocarbon-based solvents such as diethyl ether and tetrahydrofuran; chlorine-based solvents such as dichloromethane and chloroform; alcohol-based solvents such as methanol, ethanol, isopropanol, n-butyl alcohol, cyclohexyl alcohol, 2-ethyl-1-hexanol, 2-methyl-1-hexanol, 2-methoxyethanol, 2-propoxyethanol, 2-butoxyethanol, and diacetone alcohol; carbonate-based solvents such as dimethyl carbonate, diethyl carbonate, diisopropyl carbonate, methyl ethyl carbonate, and methyl n-propyl carbonate; ester-based solvents such as ethyl formate, propyl formate, pentyl formate, methyl acetate, ethyl acetate, propyl acetate, methyl propionate, ethyl propionate, ethyl 2-ethoxypropionate, methyl acetoacetate, ethyl acetoacetate, methyl 2-methoxyacetate, methyl 2-ethoxyacetate, and ethyl 2-ethoxyacetate; ether-based solvents such as ethylene glycol ethyl ether, ethylene glycol isopropyl ether, ethylene glycol butyl ether, propylene glycol methyl ether, dibutyl ether, dimethoxyethane, diethoxyethane, tetrahydrofuran, anisole, and phenetole; ketone-based solvents such as acetone, 1,2-diacetoxyacetone, acetyl acetone, methyl ethyl ketone, diethyl ketone, dipropyl ketone, diisobutyl ketone, cyclopentanone, cyclohexanone, methyl cyclohexanone, methyl isobutyl ketone, 2-octanone, 2-pentanone, and 2-hexanone; and the like. One kind of these solvents can be used singly, or two or more kinds thereof can be used in combination.

<Thickness>

The thickness of the stress relaxation layer is not particularly limited as long as the total thickness of the stress relaxation layer and the aforementioned polymer film is equal to or less than 80 µm. However, the thickness of the stress relaxation layer is preferably equal to or greater than 1.0 µm, since the pencil hardness of the surface of the polarizing plate is further improved. From the viewpoint of further making the polarizing plate thinner, the thickness of the stress relaxation layer is preferably equal to or less than 15 µm, more preferably 1.0 µm to 10 µm, and even more preferably 1.0 µm to 5 µm.

<Relationship Between Thickness of Polymer Film and Thickness of Stress Relaxation Layer>

In the present invention, the thickness of each of the polymer film and the stress relaxation layer preferably satisfies the relationship of the following Expression (2), and more preferably satisfies the relationship of the following Expression (2'), since the pencil hardness of the surface of the polarizing plate is further improved.

$$0.02 < D/C < 0.25 \tag{2}$$

$$0.05 < D/C < 0.10 \tag{2'}$$

(In the expressions, C represents the thickness of the polymer film, and D represents the thickness of the stress relaxation layer.)

<Elastic Modulus>

The elastic modulus of the stress relaxation layer is not particularly limited, as long as the relationship between the elastic modulus of the stress relaxation layer and the elastic modulus of the aforementioned polymer film satisfies Expression (1). However, the elastic modulus of the stress relaxation layer is preferably 1 GPa to 5 GPa, and more preferably 1.5 GPa to 4.5 GPa, since within the above range, the pencil hardness of the surface of the polarizing plate, the brittleness of the polarizing plate, or the like can be further improved.

The measurement method, measurement apparatus, and measurement conditions for the elastic modulus of the stress relaxation layer are the same as described in the measurement method for the elastic modulus of the aforementioned polymer film.

<Relationship Between Elastic Modulus of Polymer Film and Elastic Modulus of Stress Relaxation Layer>

In the present invention, as described above, the elastic modulus of each of the polymer film and the stress relaxation layer satisfies the relationship of the following Expression (1). However, the elastic moduli preferably satisfy the relationship of the following Expression (1'), since the pencil hardness of the surface of the polarizing plate is further improved.

$$0.01 < B/A < 0.9 \tag{1}$$

$$0.6 < B/A < 0.9 \tag{1'}$$

(In the expressions, A represents the elastic modulus of the polymer film, and B represents the elastic modulus of the stress relaxation layer.)

[Polarizer]

The polarizer included in the polarizing plate of the present invention is not particularly limited, and a generally used polarizer can be used.

Examples of the polarizer include a polarizer, which is obtained by causing a dichroic substance such as iodine or a dichroic dye to be adsorbed onto a hydrophilic polymer film such as a polyvinyl alcohol-based film, a partially formalized polyvinyl alcohol-based film, or an ethylene/vinyl acetate copolymer-based partially saponified film and then uniaxially stretching the film; a polyene-based alignment film of dehydration-processed polyvinyl alcohol or dehydrochlorination-processed polyvinyl chloride; and the like.

Among these, a polarizer consisting essentially of a polyvinyl alcohol-based film and a dichroic substance such as iodine is suitable.

<Thickness>

The thickness of the polarizer is not particularly limited. However, it is preferably equal to or less than 25 μm, more preferably equal to or less than 20 μm, and even more preferably equal to or less than 15 μm, since the thickness of the polarizing plate can be reduced. The lower limit of the thickness is not particularly limited, but is generally equal to or greater than 1 μm.

<Elastic Modulus>

The elastic modulus of the polarizer is preferably 2 GPa to 10 GPa, more preferably 3.5 GPa to 10 GPa, and even more preferably 5 GPa to 10 GPa, since within the above range, the pencil hardness of the surface of the polarizing plate and the brittleness of the polarizing plate can be further improved.

The measurement method, measurement apparatus, and measurement conditions for the elastic modulus of the polarizer are the same as described in the measurement method for the elastic modulus of the aforementioned polymer film.

[Hard Coat Layer]

As shown in FIG. 2, the polarizing plate of the present invention preferably has a hard coat layer disposed on the side of the polymer film that is opposite to the side where the stress relaxation layer is disposed.

As the hard coat layer, for example, those described in paragraphs [0190] to [0196] in JP 2009-98658 A can be used.

The hard coat layer is preferably formed by a crosslinking reaction or a polymerization reaction of an ionizing radiation-curable compound.

For example, the hard coat layer can be formed by coating a protective layer, which will be described later, with a coating composition containing a polyfunctional monomer or a polyfunctional oligomer that can be cured by ionizing radiation and then crosslinking or polymerizing the polyfunctional monomer or the polyfunctional oligomer.

As the functional group of the polyfunctional monomer or the polyfunctional oligomer that can be cured by ionizing radiation, a photopolymerizable functional group, an electron beam-polymerizable functional group, and a radiation-polymerizable functional group are preferable. Among these, a photopolymerizable functional group is preferable.

Examples of the photopolymerizable functional group include unsaturated polymerizable functional groups such as a (meth)acryloyl group, a vinyl group, a styryl group, and an allyl group. Among these, a (meth)acryloyl group is preferable.

In order to obtain internal scattering properties, the hard coat layer may contain matting particles having an average particle size of 1.0 μm to 10.0 μm and preferably having an average particle size of 1.5 μm to 7.0 μm, for example, inorganic compound particles or resin particles.

<Thickness>

The thickness of the hard coat layer is not particularly limited, as long as a difference between the distance Ds from the surface of the polarizing plate on the side of the polymer film to the interface between the polymer film and the stress relaxation layer and the thickness C of the polymer film is less than 15 μm. That is, the thickness of the hard coat layer is not particularly limited as long as it is less than 15 μm. However, it is preferable to use a hard coat layer having a thickness of equal to or greater than 1 μm and less than 15 μm, and the thickness thereof is more preferably 2 μm to 10 μm.

<Elastic modulus>

The elastic modulus of the hard coat layer is preferably 1 GPa to 7 GPa, more preferably 3 GPa to 6.5 GPa, and even more preferably 4.5 GPa to 6.5 GPa, since within the above range, the pencil hardness of the surface of the polarizing plate and the brittleness of the polarizing plate can be further improved.

Herein, the elastic modulus of the hard coat layer is measured by the following method.

A laminate of a hard coat layer and a film of which the physical properties have been identified is prepared. Thereafter, an elastic modulus (Es) of the film and an elastic modulus (Ec) of the laminate of the hard coat layer and the film are determined from an initial slope in a stress-strain curve of the film and the laminate obtained by a tensile strength tester. Then, by using each of the following equations of an internal stress, an elastic modulus (Ef) of the hard coat layer is calculated. Herein, the tensile test is performed by applying a load in a range in which the hard coat layer does not rupture.

$$\sigma c(b+d) = \sigma fd + \sigma sb$$

$$Ec(b+d) = Efd + Esb$$

$$\therefore Ef = (Ec(b+d) - Esc)/d$$

σc: an internal stress of the laminate of the hard coat layer and the film
σf: an internal stress of the hard coat layer
σs: an internal stress of the film
Ec: an elastic modulus of the laminate of the hard coat layer and the film
Ef: an elastic modulus of the hard coat layer
Es: an elastic modulus of the film
b: a thickness of the film
d: a thickness of the hard coat layer The measurement method, measurement apparatus, and measurement conditions for the elastic modulus of the hard coat layer are the same as described in the measurement method for the elastic modulus of the aforementioned polymer film.

As the film of which the physical properties have been identified, the polarizer or the polymer film used in the image display apparatus and the polarizing plate of the present invention may be used.

[Image Display Apparatus]

The image display apparatus of the present invention is an image display apparatus including the aforementioned polarizing plate and a display element (for example, a liquid crystal cell or an organic EL display panel) of the present invention.

Examples of such an image display apparatus suitably include a liquid crystal display apparatus (hereinafter, also referred to as a "liquid crystal display apparatus of the present invention") having a liquid crystal cell and a pair of polarizing plates disposed in a state of interposing the liquid crystal cell therebetween, in which at least one of the pair of polarizing plates is constituted with the aforementioned polarizing plate of the present invention.

In the liquid crystal display apparatus of the present invention, the polarizing plate of the present invention is preferably used as the polarizing plate on the front side between the polarizing plates disposed on both sides of the liquid crystal cell. More preferably, the polarizing plate of the present invention is used as both of the polarizing plates on the front and rear sides.

[Display Element]

The display element used in the image display apparatus of the present invention is not particularly limited, and examples thereof include a liquid crystal cell, an organic EL display panel, a plasma display panel, and the like.

Among these, a liquid crystal cell and an organic EL display panel are preferable, and a liquid crystal cell is more preferable. That is, the image display apparatus of the present invention is preferably a liquid crystal display apparatus using a liquid crystal cell as a display element or an organic EL display apparatus using an organic EL display panel as a display element, and more preferably a liquid crystal display apparatus.

<Liquid crystal cell>

The liquid crystal cell used in the liquid display apparatus of the present invention is preferably a VA-mode liquid crystal cell, an OCB-mode liquid crystal cell, an IPS-mode liquid crystal cell, or a TN-mode liquid crystal cell, but is not limited thereto.

In the TN-mode liquid crystal cell, when voltage is not applied thereto, rod-like liquid crystalline molecules are substantially horizontally aligned and also aligned in a state of being twisted at an angle of 60° to 120°. The TN-mode liquid crystal cell is most frequently used in a color TFT liquid crystal display apparatus and described in many documents.

In the VA-mode liquid crystal cell, rod-like liquid crystalline molecules are substantially vertically aligned when voltage is not applied thereto. The VA-mode liquid crystal cell includes (1) a VA-mode liquid crystal cell (described in JP 2-176625 A) in a narrow sense, in which rod-like liquid crystalline molecules are substantially vertically aligned when voltage is not applied thereto and substantially horizontally aligned when voltage is applied thereto, (2) a liquid crystal cell (of an MVA mode) (described in SID 97, Digest of tech. Papers (proceeding) 28 (1997), 845), which is obtained by making the VA mode into a multi-domain VA mode so as to enlarge the viewing angle, (3) a liquid crystal cell (of an n-ASM mode) (described in proceeding of Japanese Liquid Crystal Conference, 58 to 59 (1998)), which adopts a mode in which rod-like liquid crystalline molecules are substantially vertically aligned when voltage is not applied thereto and aligned in a twisted multi-domain manner when voltage is applied thereto, and (4) a liquid crystal cell of a SURVIVAL mode (presented in LCD International 98'). Furthermore, the liquid crystal cell may be any of a PVA (Patterned Vertical Alignment) type, an optical alignment type, and a PSA (Polymer-Sustained Alignment) type. Details of these modes are specifically described in JP 2006-215326 A and JP 2008-538819 A.

In the IPS-mode liquid crystal cell, rod-like liquid crystal molecules are substantially aligned in a state of being parallel to a substrate, and when an electric field parallel to the substrate surface is applied thereto, the liquid crystal molecules planarly respond. In the IPS mode, black display is performed while the electric field is not being applied to the liquid crystal cell, and absorption axes of a pair of polarizing plates including an upper polarizing plate and a lower polarizing plate are orthogonal to each other. JP 10-54982 A, JP 11-202323 A, JP 9-292522 A, JP 11-133408 A, JP 11-305217 A, JP 10-307291 A, and the like disclose a method for reducing leakage light in an oblique direction at the time of black display by using an optical compensation sheet and thus improving a viewing angle.

<Organic EL Display Panel>

The organic EL display panel as a preferable example of the image display apparatus of the present invention is a display panel constituted with an organic EL element composed of electrodes (an anode and a cathode) and an organic light-emitting layer (organic electroluminescence layer) interposed between the electrodes.

The constitution of the organic EL display panel is not particularly limited, and a known constitution can be adopted.

As the organic EL display apparatus, which is an example of the image display apparatus of the present invention, for example, an embodiment is suitable in which the polarizing plate of the present invention, a plate having a λ/4 function (hereinafter, the plate will be also referred to as a "λ/4 plate"), and an organic EL display panel are included in this order from the visually recognized side.

The "plate having a λ/4 function" refers to a plate having a function of converting linearly polarized light having a specific wavelength into circularly polarized light (or a function of converting circularly polarized light into linearly polarized light). For example, the embodiment in which the λ/4 plate has a single layer structure specifically includes a stretched polymer film, a phase difference film in which an optically anisotropic layer having the λ/4 function has been disposed on a support, and the like. Moreover, the embodiment in which the λ/4 plate has a multi-layer structure specifically include, for example, a broadband λ/4 plate obtained by laminating a λ/4 plate and a λ/2 plate on each other.

[Pressure-Sensitive Adhesive/Adhesive]

In the image display apparatus of the present invention, the aforementioned polarizing plate of the present invention and the display element may be stuck on each other through a pressure-sensitive adhesive or an adhesive.

The pressure-sensitive adhesive or the adhesive used in the present invention is not particularly limited, and generally used pressure-sensitive adhesives (for example, an acryl-based pressure-sensitive adhesive) or adhesives (for example, a polyvinyl alcohol-based adhesive) can be used.

As the pressure-sensitive adhesive or the adhesive usable in the present invention, for example, it is possible to use the pressure-sensitive adhesive described in paragraphs [0100] to [0115] in JP 2011-037140 A, paragraphs [0155] to [0171] in JP 2009-292870 A, and the like.

In the present invention, for example, when the composition containing the aforementioned compound having the unsaturated double bond group is used as the aforementioned stress relaxation layer, the stress relaxation layer may also function as the pressure-sensitive adhesive or the adhesive.

EXAMPLES

Hereinafter, the present invention will be more specifically described based on examples. The materials, the amount and proportion thereof used, the content and procedure of processing, and the like described in the following examples can be appropriately modified within a range that does not depart from the gist of the present invention. Therefore, the scope of the present invention is not limited to the following examples.

[Polymer Film 1]
<Preparation of Cellulose Acylate Dope for Core Layer>
The following composition was put into a mixing tank and stirred so as to dissolve the respective components, thereby preparing a cellulose acetate solution.

| | |
|---|---|
| Cellulose acetate having a degree of acetyl substitution of 2.88 | 100.0 parts by mass |
| Ester oligomer A | 10.0 parts by mass |
| Agent for improving durability of polarizer (compound represented by the following structural formula) | 4.0 parts by mass |
| Ultraviolet absorber (compound represented by the following structural formula) | 2.0 parts by mass |
| Methylene chloride (first solvent) | 430.0 parts by mass |
| Methanol (second solvent) | 64.0 parts by mass |

The ester oligomer A is an aromatic ester oligomer, and contains a repeating unit derived from dicarboxylic acid and a repeating unit derived from diol at a ratio of 1:1. Provided that in the repeating unit derived from dicarboxylic acid, a molar ratio of a repeating unit derived from aliphatic dicarboxylic acid is m, and a molar ratio of a repeating unit derived from aromatic dicarboxylic acid is n, m=0, and n=10.

As the aromatic dicarboxylic acid, phthalic acid was used, and as the diol, ethylene glycol was used.

Both terminals of the ester oligomer were sealed with an acetyl group. A hydroxyl value of the ester oligomer was 0 mgKOH/g, and a number-average molecular weight thereof was 1,000.

These results are shown in Table 1.

Agent for improving durability of polarizer

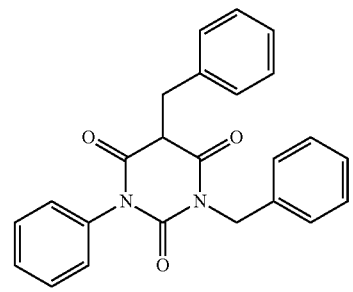 [SMILES: O=C1C(Cc2ccccc2)C(=O)N(c2ccccc2)C(=O)N1Cc1ccccc1]

Ultraviolet absorber

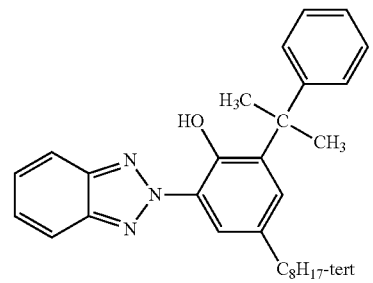

<Preparation of Cellulose Acylate Dope for Outer Layer>
10 parts by mass of the following matting agent solution was added to 90 parts by mass of the aforementioned cellulose acylate dope for a core layer, thereby preparing a cellulose acetate solution for an outer layer.

| | |
|---|---|
| Silica particles having average particle size of 20 nm (AEROSIL R972 manufactured by Nippon Aerosil Co., Ltd.) | 2.0 parts by mass |
| Methylene chloride (first solvent) | 76.0 parts by mass |
| Methanol (second solvent) | 11.0 parts by mass |
| Cellulose acylate dope for core layer | 1.0 part by mass |

<Preparation of Cellulose Acylate Film>
The cellulose acylate dope for a core layer and the cellulose acylate dope for an outer layer to be disposed on both sides of the core layer were simultaneously cast onto a drum at 20° C. from a casting outlet. The film was peeled in a state of containing about 20% by mass of the solvent, and both ends of the film in the width direction were fixed to tenter clips. In a state in which the amount of the residual solvent was 3% to 15%, the film was dried while being stretched by 1.1-fold in a transverse direction. Thereafter, the film was transported between rolls of a thermal process-

TABLE 1

| Type of ester oligomer | Dicarboxylic acid | | | Diol | Terminal | Hydroxyl value (mgKOH/g) | Molecular weight |
| | Ailphatic (m) | Aromatic (n) | | | | | |
| | Adipic acid | Phthalic acid | Terephthalic acid | | | | |
|---|---|---|---|---|---|---|---|
| A | 0 | 10 | 0 | Ethylene glycol | Acetyl group | 0 | 1,000 | ing apparatus and further dried, thereby preparing a cellulose acylate (TAC) film having a thickness of 40 μm. The film was named polymer film 1.

[Polymer Film 2]

A cellulose acylate film was prepared according to the same procedure as in Preparation of cellulose acylate film, except that the film thickness was changed to 25 μm. The film was named polymer film 2.

[Polymer Film 3]

A cellulose acylate film was prepared according to the same procedure as in Preparation of cellulose acylate film, except that the film thickness was changed to 60 μm. The film was named polymer film 3.

[Polymer Film 4]

41.5 parts by mass of methyl methacrylate (MMA), 6 parts by mass of methyl 2-(hydroxymethyl)acrylate (MHMA), 2.5 parts by mass of 2-[2'-hydroxy-5'-methacryloyloxy]ethylphenyl]-2H-benzotriazole (RUVA-93, manufactured by Otsuka Chemical Co., Ltd.), 50 parts by mass of toluene as a polymerization solvent, 0.025 parts by mass of an antioxidant (ADEKA Stab 2112, manufactured by Asahi Denka Kogyo K.K), and 0.025 parts by mass of n-dodecyl mercaptane as a chain transfer agent were put into a reaction tank having an internal volume of 30 L equipped with a stirring apparatus, a temperature sensor, a cooling tube, and a nitrogen introduction tube. Thereafter, the temperature of the reaction tank was increased to 105° C. under a nitrogen stream. At a point in time when reflux started due to the increase of temperaLure, 0.05 parts by mass of t-amylperoxyisononanoate (Luperox 570, manufactured by ARKEMA Yoshitomi, Ltd.) as a polymerization initiator was added thereto. Furthermore, while 0.10 parts by mass of t-amylperoxyisononanoate was being added dropwise thereto over 3 hours, solution polymerization was performed under reflux at a temperature of about 105° C. to 110° C., and the solution was further aged for 4 hours.

Subsequently, 0.05 parts by mass of 2-ethylhexyl phosphate (Phoslex A-8, manufactured by SAKAI CHEMICAL INDUSTRY CO., LTD.) as a catalyst (a cyclization catalyst) for a cyclocondensation reaction was added to the obtained polymerized solution, and the cyclocondensation reaction was performed for 2 hours under reflux at a temperature of about 90° C. to 110° C. Thereafter, the polymerized solution was heated for 30 minutes in an autoclave at a temperature of 240° C. so as to further perform the cyclocondensation reaction. Then, the polymerized solution obtained after the reaction was mixed with 0.94 parts by mass of CGL 777MPA (manufactured by BASF Corporation) as an ultraviolet absorber.

Thereafter, the obtained polymerized solution was introduced into a twin screw extruder (Φ=50.0 mm, L/D=30) with vent-type screws, which has a barrel temperature of 240° C., a rotation frequency of 100 rpm, a degree of pressure reduction of 13.3 hPa to 400 hPa (10 mmHg to 300 mmHg), one rear vent, four fore vents (called the first, second, third, and fourth vents respectively from the upstream side), and a leaf disc-type polymer filter (filtration accuracy of 5μ, a filtration area of 1.5 m$^2$) disposed in the tip portion of the extruder, at a processing rate of 45 kg/hr expressed in terms of an amount of resin, thereby performing devolatilization. At this time, a mixed solution of an antioxidant/an inactivator for a cyclization catalyst that was separately prepared in advance was put into the extruder from the back of the first vent at a rate of 0.68 kg/hr, and deionized water was put into the extruder from the back of the third vent at a rate of 0.22 kg/hr.

As the mixed solution of an antioxidant/an inactivator for a cyclization catalyst, a solution was used which was obtained by dissolving 50 parts by mass of an antioxidant (Sumilizer GS, manufactured by Sumitomo Chemical Co., Ltd.) and, as an inactivator, 35 parts by mass of zinc octylate (Nikka Octics zinc 3.6%, manufactured by NIHON KAGAKU SANGYO CO., LTD.) in 200 parts by mass of toluene.

After the devolitilization ended, the thermally melted resin remained inside the extruder was discharged from the tip of the extruder while being filtered through the polymer filter, and made into pellets by a pelletizer. In this manner, pellets of a transparent resin composition containing acryl resin having a lactone ring structure on a main chain thereof and the ultraviolet absorber were obtained. The weight-average molecular weight of the resin was 145,000, and the glass transition temperature (Tg) of the resin and the resin composition was 122° C.

The pellets of the transparent resin composition prepared as above that contain the acryl resin having a lactone ring structure on a main chain thereof and the ultraviolet absorber were melt-extruded from a coat hanger-type T die by using a twin screw extruder, thereby preparing an acryl-based polymer film having a thickness of 40 μm. The polymer film was named polymer film 4.

As described above, the elastic modulus of each of the prepared polymer films 1 to 4 was calculated by the aforementioned method by preparing a total of 8 samples each having 100 mm long in a measurement direction and 10 mm wide by cutting the samples at an azimuth varied by 45° in the measurement direction. The results are shown in the following Table 2.

Furthermore, from each of the prepared polymer films 1 to 4, a total of 8 samples each having 35 mm long in a measurement direction and 5 mm wide were prepared by being cut at an azimuth varied by 45° in the measurement direction, and the elastic moduli thereof were measured by the aforementioned method. As a result, the elastic moduli of the polymer films 1 to 4 were almost the same as the results calculated as above.

[Preparation of Coating Liquid for Hard Coat Layer (HC-1)]

The following components were mixed together in the amount shown below and filtered through a filter made of polypropylene having a pore size of 30 μm, thereby preparing a coating liquid for a hard coat layer HC-1.

| | |
|---|---|
| DPHA (binder) | 22.9 parts by mass |
| PET-30 (binder) | 22.9 parts by mass |
| Irgacure 184 (polymerization initiator) | 1.5 parts by mass |
| Toluene (solvent) | 45.2 parts by mass |

The used compounds are as follows.
DPHA: a mixture of dipentaerythritol hexaacrylate and dipentaerythritol pentaacrylate [manufactured by Nippon Kayaku Co., Ltd.];
PET-30: a mixture of pentaerythritol triacrylate and pentaerythritol tetraacrylate [manufactured by Nippon Kayaku Co., Ltd.];
Irgacure 184: a polymerization initiator [manufactured by BASF Corporation]

[Preparation of Composition for Forming Stress Relaxation Layer 1]

The following components were mixed together in the amount shown below in the same manner as used for the aforementioned coating liquid for a hard coat layer (HC-1), and filtered through a filter made of polypropylene having a pore size of 30 μm, thereby preparing a composition for forming a stress relaxation layer 1.

| | |
|---|---|
| DPHA (binder) | 22.9 parts by mass |
| PET-30 (binder) | 22.9 parts by mass |
| Irgacure 184 (polymerization initiator) | 1.5 parts by mass |
| Toluene (solvent) | 45.2 parts by mass |

[Preparation or Composition for Forming Stress Relaxation Layer 2]

The following components were mixed together in the amount shown below, put into a separable flask made of glass equipped with a stirrer, and stirred for 5 hours at room temperature. Thereafter, the resultant was filtered through a depth filter made of polypropylene having a pore size of 5 μm, thereby preparing a composition for forming a stress relaxation layer 2.

| | |
|---|---|
| A-DCP (100%): tricyclodecane dimethanol dimethacrylate [manufactured by SHIN-NAKAMURA CHEMICAL CO., LTD.] | 97.0 parts by mass |
| Irgacure 907 (100%): polymerization initiator [manufactured by BASF Corporation] | 3.0 parts by mass |
| SP-13 represented by the following formula (leveling agent) | 0.04 parts by mass |
| MEK (methyl ethyl ketone) | 81.8 parts by mass |

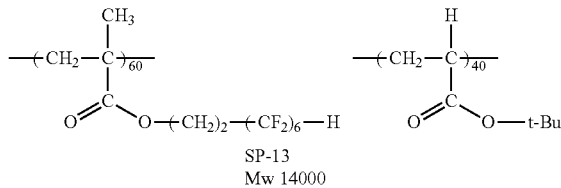

SP-13
Mw 14000

[Preparation of Composition for Forming Stress Relaxation Layer 3]

The following components were mixed together in the amount shown below, put into a separable flask made of glass equpped with a stirrer, and stirred for 5 hours at room temperature. Thereafter, the resultant was filtered through a depth filter made of polypropylene having a pore size of 5 μm, thereby preparing a composition for forming a stress relaxation layer 3.

| | |
|---|---|
| Cyclic polyolefin-based resin TOPAS 6013 [manufactured by Polyplastics Co., Ltd.] | 100 parts by mass |
| Cyclohexane | 510 parts by mass |
| Cyclohexanone | 57 parts by mass |

[Preparation of Composition for Forming Stress Relaxation Layer 4]

The following components were mixed together in the amount shown below, put into a separable flask made of glass equpped with a stirrer, and stirred for 5 hours at room temperature. Thereafter, the resultant was filtered through a depth filter made of polypropylene having a pore size of 5 μm, thereby preparing a composition for forming a stress relaxation layer 4.

| | |
|---|---|
| A-TMMT: [manufactured by SHIN-NAKAMURA CHEMICAL CO., LTD.] | 100.0 parts by mass |
| DPHA (binder) | 20.0 parts by mass |
| Irgacure 127: polymerization initiator [manufactured by BASF Corporation] | 3.0 parts by mass |
| Methyl ethyl ketone | 159.7 parts by mass |

[Preparation of Composition for Forming Stress Relaxation Layer 5]

The following components were mixed together in the amount shown below, put into a separable flask made of glass equpped with a stirrer, and stirred for 5 hours at room temperature. Thereafter, the resultant was filtered through a depth filter made of polypropylene having a pore size of 5 μm, thereby preparing a composition for forming a stress relaxation layer 5.

| | |
|---|---|
| 4-HBA: [manufactured by OSAKA ORGANIC CHEMICAL INDUSTRY LTD.] | 90.0 parts by mass |
| HEAA: [manufactured by KOHJIN Film & Chemicals Co., Ltd.] | 5.0 parts by mass |
| Irgacure 819: [manufactured by BASF Corporation] | 0.5 parts by mass |

[Preparation of Composition for Forming Stress Relaxation Layer 6]

The following components were mixed together in the amount shown below, put into a separable flask made of glass equpped with a stirrer, and stirred for 5 hours at room temperature. Thereafter, the resultant was filtered through a depth filter made of polypropylene having a pore size of 5 μm, thereby preparing a composition for forming a stress relaxation layer 6.

| | |
|---|---|
| Inorganic particles (surface-modified silica) MEK-AC: [manufactured by NISSAN CHEMICAL INDUSTRIES, LTD] | 100.0 parts by mass |
| Irgacure 127: polymerization initiator: [manufactured by BASF Corporation] | 3.0 parts by mass |
| Methyl ethyl ketone | 180.2 parts by mass |

[Preparation of Polarizer 1]

A polyvinyl alcohol (PVA) film having a thickness of 45 μm was dyed by being dipped into an iodine aqueous solution with an iodine concentration of 0.05% by mass at 30° C. for 60 seconds. Thereafter, while being dipped into a boric acid aqueous solution with a boric acid concentration of 4% by mass for 60 seconds, the film was stretched in a machine direction such that the length thereof became 5 times the original length, and then dried for 4 minutes at 50° C. In this manner, a polarizer 1 having a thickness of 15 μm was prepared.

As described above, the elastic modulus of the prepared polarizer 1 was calculated by the aforementioned method by preparing a total of 8 samples each having 100 mm long in a measurement direction and 10 mm wide by cutting the samples at an azimuth varied by 45° in the measurement direction. The result is shown in the following Table 2.

Furthermore, from the prepared polarizer 1, a total of 8 samples each having 35 mm long in a measurement direction and 5 mm wide were prepared by being cut at an azimuth varied by 45° in the measurement direction, and the elastic moduli thereof were measured by the aforementioned method. As a result, the elastic modulus of the polarizer 1 was almost the same as the result calculated as above.

Example 1

[Preparation of Polymer Film with Hard Coat Layer]

The prepared polymer film 1 was coated wth the coating liquid for a hard coat layer (HC-1) by a die coating method by setting a coating thickness to be 5 μm. Thereafter, the film was dried for 120 seconds at room temperature and then for 150 seconds at 60° C. Then, while nitrogen purging (an oxygen concentration of equal to or less than 0.5%) was being performed, by using an air-cooled metal halide lamp (manufactured by EYE GRAPHICS Co., Ltd.) of 160 W/cm, the film was irradiated with ultraviolet rays at an illuminance of 400 mW/cm$^2$ and an irradiation amount of 150 mJ/cm$^2$ so as to cure the coating layer, thereby forming a hard coat layer. In this manner, the polymer film 1 with a hard coat layer was prepared. The thickness of the hard coat layer was 5 μm.

For obtaining the elastic modulus of the formed hard coat layer, the elastic modulus of the prepared polymer film 1 with a hard coat layer was calculated by the same method as used for the polymer film 1 prepared as above. Moreover, by using each of the aforementioned equations of internal stress and using the polymer film 1 prepared above as the film of which the physical properties had been identified, the elastic modulus (Ef) of the hard coat layer was calculated. The result is shown in the following Table 2. Furthermore, from the prepared polymer film 1 with a hard coat layer, a total of 8 samples each having 35 mm long in a measurement direction and 5 mm wide were prepared by being cut at an azimuth varied by 45° in the measurement direction, and elastic moduli thereof were measured by the aforementioned method. As a result, the elastic modulus of the polymer film 1 with a hard coat layer was almost the same as the result calculated as above.

[Formation of Stress Relaxation Layer]

The surface of the polymer film 1 with a hard coat layer that had not been coated with a hard coat was coated with the aforementioned composition for a stress relaxation layer 1. Subsequently, the film was dried for 1 minute at 25° C. and then for about 5 minutes at 80° C., thereby obtaining a polymer film 1 with a stress relaxation layer. The thickness of the stress relaxation layer was 4.9 μm.

For obtaining the elastic modulus of the formed stress relaxation layer, the elastic modulus of the prepared polymer film 1 with a stress relaxation layer was calculated by the same method as used for the polymer film 1 prepared as above. Moreover, by using each of the aforementioned equations of internal stress and using the polymer film 1 prepared above as the film of which the physical properties had been identified, the elastic modulus (Ef) of the stress relaxation layer was calculated. The result is shown in the following Table 2. Furthermore, from the prepared polymer film 1 with a stress relaxation layer, a total of 8 samples each having 35 mm long in a measurement direction and 5 mm wide were prepared by being cut at an azimuth varied by 45° in the measurement direction, and elastic moduli thereof were measured by the aforementioned method. As a result, the elastic modulus of the polymer film 1 with a stress relaxation layer was almost the same as the result calculated as above.

[Preparation of Polarizing Plate]

<Saponification Processing of Polymer Film>

The polymer film 1 with a stress relaxation layer was dipped into a 2.3 mol/L sodium hydroxide aqueous solution for 3 hours at 55° C. The film was then washed in a water bath at room temperature, and neutralized with 0.05 mol/L sulfuric acid at 30° C. Thereafter, the film was washed again in a water bath at room temperature and dried with hot air at 100° C. In this manner, saponification processing was performed on the hard coat layer-free surface (stress relaxation layer) of the polymer film 1 with a stress relaxation layer.

<Sticking Polarizer 1 on Polymer Film 1 with Stress Relaxation Layer having Undergone Saponification Processing>

The saponified surface (hard coat layer-free surface) of the polymer film 1 with a stress relaxation layer, which had undergone the saponification processing, was stuck on one side of the polarizer 1 prepared as above by using a polyvinyl alcohol-based adhesive, thereby preparing a polarizing plate. Herein, Lhe polymer film 1 and the polarizer 1 were stuck on each other such that the transport direction of the polymer film 1 became identical to the stretch direction of the polarizer 1.

Example 2

A polarizing plate was prepared in the same manner as in Example 1, except that the polymer film 2 was used instead of the polymer film 1.

Example 3

A polarizing plate was prepared in the same manner as in Example 1, except that the polymer film 3 was used instead of the polymer film 1.

Example 4

A polarizing plate was prepared in the same manner as in Example 1, except that the thickness of the stress relaxation layer was changed to 0.5 μm.

Example 5

A polarizing plate was prepared in the same manner as in Example 1, except that the composition for forming a stress relaxation layer 2 was used instead of the composition for forming a stress relaxation layer 1, and the thickness of the stress relaxation layer was changed to 9.1 μm.

Example 6

A polarizing plate was prepared in the same manner as in Example 1, except that the composition for forming a stress relaxation layer 3 was used instead of the composition for forming a stress relaxation layer 1, and the thickness of the stress relaxation layer was changed to 2.5 μm.

Example 7

A polarizing plate was prepared in the same manner as in Example 6, except that the polymer film 2 was used instead of the polymer film 1.

Example 8

A polarizing plate was prepared in the same manner as in Example 1, except that the polymer film 4 was used instead of the polymer film 1, the composition for forming a stress relaxation layer 4 was used instead ot the composition for forming a stress relaxation layer 1, and the thickness of the stress relaxation layer was changed to 5 μm.

Comparative Example 1

A polarizing plate was prepared in the same manner as in Example 1, except that the stress relaxation layer was not formed, and the saponified surface (hard coat layer-free surface) of the polymer film 1 with a hard coat layer, which had undergone the saponification processing, was stuck on one side of the polarizer 1 prepared as above by using a polyvinyl alcohol-based adhesive.

Comparative Example 2

A polarizing plate was prepared in the same manner as in Example 1, except that the composition for forming a stress relaxation layer 5 was used instead of the composition for forming a stress relaxation layer 1, and the thickness of the stress relaxation layer was changed to 10 μm.

Comparative Example 3

A polarizing plate was prepared in the same manner as in Example 1, except that the composition for forming a stress relaxation layer 6 was used instead of the composition for forming a stress relaxation layer 1, and the thickness of the stress relaxation layer was changed to 5 μm.

The elastic modulus of each of the hard coat layer, the polymer films 1 to 4, the stress relaxation layer, and the polarizer in each of the prepared polarizing plates was measured by the aforementioned measurement method. The results are shown in the following Table 2.

[Evaluation of Pencil Hardness]

In the present invention, pencil hardness was evaluated based on JIS K 5400. The prepared polarizing plate was stuck on a glass plate by attaching a tape to three sides of the polarizing plate, and subjected to humidity conditioning for 24 hours at a temperature of 25° C. and a relative humidity of 60%. Thereafter, by using a 3H pencil for test specified by JIS S 6006, the test was performed 20 times each sample under a load of 500 g, and the pencil hardness was evaluated based on the following criteria. The results are shown in the following Table 2.

<Criteria for Hardness Evaluation>

A: As a result of the test performed 20 times, scratches in a number of equal to or greater than 0 and equal to or less than 3 are formed.

B: As a result of the test performed 20 times, scratches in a number of equal to or greater than 4 and equal to or less than 7 are formed.

C: As a result of the test performed 20 times, scratches in a number of equal to or greater than 8 and equal to or less than 11 are formed.

D: As a result of the test performed 20 times, scratches in a number of equal to or greater than 12 and equal to or less than 15 are formed.

E: As a result of the test performed 20 times, scratches in a number of equal to or greater than 16 and equal to or less than 20 are formed.

Herein, the test direction (scratching direction) of the pencil was parallel to the direction of the absorption axis of the polarizer.

TABLE 2

| | | Example | | | | | | | | Comparative example | | |
|---|---|---|---|---|---|---|---|---|---|---|---|---|
| | | 1 | 2 | 3 | 4 | 5 | 6 | 7 | 8 | 1 | 2 | 3 |
| Hard coat layer | Thickness [μm] | 5 | 5 | 5 | 5 | 5 | 5 | 5 | 5 | 5 | 5 | 5 |
| | Elastic modulus [GPa] | 4 | 4 | 4 | 4 | 4 | 4 | 4 | 4 | 4 | 4 | 4 |
| | Material | DPHA PET-30 | DPHA PET-30 | DPHA PET-30 | DPHA PET-30 | DPHA PET-30 | DPHA PET-30 | DPHA PET-30 | DPHA PET-30 | DPHA PET-30 | DPHA PET-30 | DPHA PET-30 |
| Polymer film | Thickness C [μm] | 40 | 25 | 60 | 40 | 40 | 40 | 25 | 40 | 40 | 40 | 40 |
| | Elastic modulus A [GPa] | 6 | 6 | 6 | 6 | 6 | 6 | 6 | 3.5 | 6 | 6 | 6 |
| | Material | TAC | TAC | TAC | TAC | TAC | TAC | TAC | ACRYL | TAC | TAC | TAC |
| Stress relaxation layer | Thickness D [μm] | 4.9 | 4.9 | 4.9 | 0.5 | 9.1 | 2.5 | 2.5 | 5 | — | 10 | 5 |
| | Elastic modulus B [GPa] | 4.1 | 4.1 | 4.1 | 4.1 | 2.93 | 2.5 | 2.5 | 3.1 | — | 0.0001 | 10 |
| | Material | DPHA PET-30 | DPHA PET-30 | DPHA PET-30 | DPHA PET-30 | A-DCP | TOPAS | TOPAS | A-TMMT DPHA | — | 4-HBA HEAA | SILICA |
| Polarizer | Thickness [μm] | 15 | 15 | 15 | 15 | 15 | 15 | 15 | 15 | 15 | 15 | 15 |
| | Elastic modulus [GPa] | 6 | 6 | 6 | 6 | 6 | 6 | 6 | 6 | 6 | 6 | 6 |
| | Material | PVA | PVA | PVA | PVA | PVA | PVA | PVA | PVA | PVA | PVA | PVA |
| Ratio of elastic modulus (B/A) | | 0.68 | 0.68 | 0.68 | 0.68 | 0.50 | 0.42 | 0.42 | 0.88 | — | <0.01 | 1.67 |
| Total thickness of polymer film and stress relaxation layer [μm] | | 44.9 | 29.8 | 64.9 | 40.5 | 49.1 | 42.5 | 27.5 | 45.0 | 40.2 | 50.0 | 45.0 |
| Thickness ratio (D/C) | | 0.12 | 0.19 | 0.08 | 0.01 | 0.23 | 0.06 | 0.10 | 0.13 | <0.01 | 0.25 | 0.13 |
| Thickness of polarizing plate [μm] | | 64.9 | 49.8 | 84.9 | 60.5 | 69.1 | 62.5 | 47.5 | 65 | 60.2 | 70 | 65 |
| Pencil hardness | | A | B | A | C | A | B | B | B | D | E | D |

From the above results, it was found that in the polarizing plates prepared in Comparative examples 2 and 3 in which the ratio (B/A) of the elastic modulus B of the stress relaxation layer to the elastic modulus A of the polymer film is out of a range of 0.01 to 0.9, the pencil hardness ot the surface of the polarizing plate is low as in Comparative example 1 not having the stress relaxation layer.

It was also found that in contrast, in the polarizing plates prepared in Examples 1 to 8 in which the ratio (B/A) of the elastic modulus B of the stress relaxation layer to the elastic modulus A of the polymer film is within a range of 0.01 to 0.9, the pencil hardness of the surface of the polarizing plate is excellent.

Furthermore, from the comparison between Example 1 and Example 4, it was found that if the thickness of the stress relaxation layer is equal to or greater than 1.0 μm, the pencil hardness of the surface of the polarizing plate is further improved.

What is claimed is:

1. A polarizing plate comprising:
   a polymer film;
   a polarizer; and
   a stress relaxation layer disposed between the polymer film and the polarizer,
   wherein an elastic modulus of each of the polymer film and the stress relaxation layer satisfies a relationship of the following Expression (1),
   a thickness of the polymer film is equal to or greater than 10 μm,
   a distance(Ds) from the surface of the polarizing plate on the side of the polymer film to the interface between the polymer film and the stress relaxation layer is equal to or greater than 15 μm,
   a difference between the distance(Ds) and a thickness(C) of the polymer film is less than 15 μm, and
   a total thickness of the polymer film and the stress relaxation layer is equal to or less than 80 μm, $$0.01 < B/A < 0.9 \tag{1}$$

in Expression (1), A represents the elastic modulus of the polymer film, and B represents the elastic modulus of the stress relaxation layer.

2. The polarizing plate according to claim 1,
   wherein the thickness of each of the polymer film and the stress relaxation layer satisfies a relationship of the following Expression (2), $$0.02 < D/C < 0.25 \tag{2}$$

in Expression (2), C represents the thickness of the polymer film, and D represents the thickness of the stress relaxation layer.

3. The polarizing plate according to claim 1,
   wherein the thickness of the polymer film is 20 μm to 60 μm.

4. The polarizing plate according to claim 2,
   wherein the thickness of the polymer film is 20 μm to 60 μm.

5. The polarizing plate according to claim 1,
   wherein the thickness of the stress relaxation layer is 1 μm to 15 μm.

6. The polarizing plate according to claim 2,
   wherein the thickness of the stress relaxation layer is 1 μm to 15 μm.

7. The polarizing plate according to claim 1, further comprising a hard coat layer disposed on a side of the polymer film that is opposite to the side where the stress relaxation layer is disposed.

8. The polarizing plate according to claim 2, further comprising a hard coat layer disposed on a side of the polymer film that is opposite to the side where the stress relaxation layer is disposed.

9. The polarizing plate according to claim 1,
   wherein the thickness of the polarizer is equal to or less than 25 μm.

10. The polarizing plate according to claim 2,
    wherein the thickness of the polarizer is equal to or less than 25 μm.

11. An image display apparatus comprising:
    the polarizing plate according to claim 1; and
    a display element.

12. An image display apparatus comprising:
    the polarizing plate according to claim 2; and
    a display element.

13. A liquid crystal display apparatus, comprising:
    a liquid crystal cell; and
    a pair of polarizing plates disposed in a state of interposing the liquid crystal cell therebetween,
    wherein at least one of the pair of polarizing plates is the polarizing plate according to claim 1.

14. A liquid crystal display apparatus, comprising:
    a liquid crystal cell; and
    a pair of polarizing plates disposed in a state of interposing the liquid crystal cell therebetween,
    wherein at least one of the pair of polarizing plates is the polarizing plate according to claim 2.

* * * * *